United States Patent [19]

Agarwal et al.

[11] 4,387,172

[45] Jun. 7, 1983

[54] EMULSION TYPE ADHESIVE COMPOSITIONS

[75] Inventors: Pawan K. Agarwal, Westfield; S. Richard Turner; Robert D. Lundberg, both of Bridgewater, all of N.J.; Morris L. Evans, Baton Rouge, La.

[73] Assignee: Exxon Research and Engineering Co., Florham Park, N.J.

[21] Appl. No.: 320,209

[22] Filed: Nov. 12, 1981

[51] Int. Cl.³ .............................................. C08K 3/20
[52] U.S. Cl. ...................................... 524/60; 524/66; 524/71; 524/857; 524/881
[58] Field of Search ..................... 524/60, 66, 71, 857, 524/881

[56] References Cited

U.S. PATENT DOCUMENTS 3,801,531 4/1974 Berejka et al. ...................... 524/270
3,867,247 2/1975 O'Farrell et al. ................... 524/390

Primary Examiner—Melvyn I. Marquis
Attorney, Agent, or Firm—Richard E. Nanfeldt

[57] ABSTRACT

This invention relates to emulsion type adhesive compositions which include a metal neutralized sulfonated elastomeric co or terpolymer, wherein the neutralized sulfonated copolymer has about 5 to about 250 meq. of neutralized sulfonate groups per 100 grams of the neutralized sulfonated copolymer, and less than about 200 parts by weight of a hydrocarbon resin of a petroleum or coal tar distillate, having about 5 to 6 carbon atoms, the hydrocarbon resin being composed of aliphatic dienes and monoolefins per 100 parts by weight of the neutralized sulfonated co or terpolymer.

5 Claims, No Drawings

EMULSION TYPE ADHESIVE COMPOSITIONS

BACKGROUND OF THE INVENTION

1. Field of the Invention

This invention relates to emulsion type adhesive compositions which include a metal neutralized sulfonated elastomeric co or terpolymer, wherein the neutralized sulfonated copolymer has about 5 to about 250 meq. of neutralized sulfonate groups per 100 grams of the neutralized sulfonated copolmer, and less than about 200 parts by weight of a hydrocarbon resin of a petroleum or coal tar distillate, having about 5 to 6 carbon atoms, the hydrocarbon resin being composed of aliphatic dienes and monoolefins per 100 parts by weight of the neutralized sulfonated co or terpolymer.

Broadly speaking, synthetic adhesives used in packaging can be classified into four categories: water based emulsion system, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed.

With the solvent-based adhesives usually a good wetting is achieved; however, their use has been becoming extremely restrictive due to expensive energy requirements for the evaporation of organic solvents, fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, where upon solidification, a strong and durable bond is formed.

2. Prior Art

Several U.S. patents have described sulfonated polymers such as sulfonated Butyl and sulfonated EPDM in adhesive applications (e.g., U.S. Pat. Nos. 3,867,247 and 3,801,531). It is important to distinguish the instant invention over those prior art systems. The former patent are directed at a sulfonated butyl cement or EPDM terpolymer which are solvent based and are employed to laminate various substrates. It is important to note that the instant invention differs dramatically from these patents as follows:

(a) The adhesives of the instant invention are not deposited from solvents, but are water based emulsions;

(b) The instant invention may optionally include either a tackifier resin and/or plasticizer capable of associating with the neutralized sulfonate groups, and thereby reducing the melt viscosity of the resulting blends to make the systems more processable;

(c) The instant invention is directed to metal neutralized sulfonated elastomeric co or terpolymers, whereas most of the prior art deals with sulfonated Butyl rubber (e.g., U.S. Pat. No. 3,867,247).

SUMMARY OF THE INVENTION

This invention relates to emulsion type adhesive compositions which include a metal neutralized sulfonated elastomeric co or terpolymer which has about 5 to about 250 meq. of neutralized sulfonate groups per 100 grams of the neutralized sulfonated co or terpolymer and less than about 200 parts by weight of a hydrocarbon resin of a petroleum or coal tar distillate, having about 5 to about 6 carbon atoms, said hydrocarbon resin having aliphatic dienes and monoolefins therein per 100 parts by weight of the metal neutralized sulfonated elastomeric co or terpolymer and optionally, about 1 to 50 parts of a preferential plasticizer per 100 parts of the metal neutralized sulfonated elastomeric co or terpolymer can be added to the composition.

GENERAL DESCRIPTION

The present invention relates to unique and novel emulsion type adhesive compositions which comprise a mixture of a metal neutralized sulfonated elastomeric co or terpolymer and a hydrocarbon resin, wherein to the compositions can be optionally added an ionic preferential plasticizer, oil, and/or a filler, thereby modifying the properties of the emulsion type adhesive compositions.

SULFONATED POLYMER AND PROCESS FOR FORMING

The solid elastomeric co or terpolymer of the instant invention comprise at least 80% by weight of at least one conjugated diene having from 4 to 12 carbon atoms or at least 80% by weight of a combination of at least one conjugated diene and styrene, wherein the combination contains less than 50 weight percent of styrene of the total 80 weight percent and a minor proportion of a metal or amine neutralized sulfonate monomer characterized by the formula:

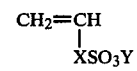

where X is $(CH_2)_n$, or aromatic wherein $n = 0, 1, 2, 3, 4$ and Y is a cation selected from Groups IA, IIA, IB and IIB of the Periodic Table or an amine of the formula:

where $R_1$ and $R_2$ can be aliphatic groups of $C_1$ to $C_{12}$ or hydrogen. The co or terpolymer is water insoluble having at least 0.5 weight percent sulfur to less than about 5 weight percent sulfur chemically combined.

The instant invention relates to the formation of emulsions of sulfonate containing co or terpolymers which are formed by a free radical copolymerization process. The monomers used in the free radical emulsion copolymerization processes are conjugated dienes which are copolymerized with sulfonate containing monomers.

In general, the conjugated diene and sulfonate containing monomer are dispersed in a water phase in the presence of a water soluble initiator or a redox system which has one component soluble in the oil phase and one component soluble in the water phase, and either with or without surfactant, wherein the temperature is sufficient to initiate polymerization. To the resultant latex is added a tackifier resin and the emulsion is doctor bladed onto a substrate and dried at room or elevated temperatures to form the adhesive film.

The co or terpolymers formed from the free radical emulsion copolymerization process of the instant invention can be generally described as having an $\overline{M}n$ as measured by GPC of about 5,000 to about 200,000, more preferably about 10,000 to about 100,000. The co or terpolymers of the instant invention contain about 0.5 to about 5 weight percent of the chemically combined sulfur, more preferably about 0.6 to about 3, and most preferably about 0.7 to about 2.0 weight percent sulfur. The co- or terpolymers of the instant invention are water insoluble, substantially gel free, thermally stable and oxidatively stable. Typical, but nonlimiting examples of the copolymers which can be formed by the instant free radical emulsion copolymerization process are: butadiene/sodium styrene sulfonate copolymer, isoprene/sodium styrene sulfonate copolymer, butadiene/sodium vinyl sulfonate copolymer, isoprene/sodium vinyl sulfonate copolymer. Obviously, a large number of copolymers and even terpolymers can be formed by the instant free radical copolymerization process. Typically, the copolymerization of any conjugated diene as so defined herein can be readily copolymerized with any sulfonate containing monomer as is defined herein. Terpolymers with styrene, acrylonitrile, vinyl chloride as the termonomers with the aforementioned dienes are also contemplated provided that no more than 10 weight percent of the termonomer is combined therein.

CONJUGATED DIENES

The conjugated dienes of the instant invention are generally defined as acyclic conjugated dienes containing from about 4 to about 10 carbon atoms more preferably about 4 to about 6 carbon atoms. Typical, but non-limiting examples of acyclic conjugated dienes are 1,3-butadiene, isoprene (2-methyl-1,3-butadiene), 2,3-dimethyl, 1,3-pentadiene, 2-methyl-1,3-pentadiene, 2,3-dimethyl-1,3-pentadiene, 3-methyl-1,3-pentadiene, 2-phenyl butadiene, chloroprene and piperidine. Typical, but non-limiting examples of cyclic conjugated dienes are cyclopentadiene and methyl cyclopentadiene. The preferred conjugated dienes of the instant invention are selected from the group consisting of 1,3-butadiene, isoprene and chloroprene. In the formation of the sulfonate containing copolymer, one copolymerizes one of the aforementioned conjugated dienes with the sulfonate containing monomer. Sulfonate containing terpolymers can be readily formed by copolymerizing the sulfonate containing monomer with a mixture of two of the above identified conjugated dienes.

SULFONATE CONTAINING MONOMERS

The sulfonate containing monomers of the instant invention which are water soluble can be generally described as a monomer having unsaturation and a metal or amine sulfonate group. The metal or amine neutralized sulfonate monomer is characterized by the formula:

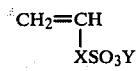

where X is aromatic or $(CH_2)_n$, where $n=0, 1, 2, 3, 4$ and Y is a cation selected from Groups IA, IIA, IB and IIB of the Periodic Table of an amine of the formula:

where $R_1$ and $R_2$ can be aliphatic groups of $C_1$ to $C_{12}$ or hydrogen. Particularly suitable metal cations are sodium, potassium, magnesium, and zinc, and an especially preferred metal cation is sodium. Typical but non-limiting examples of suitable sulfonate containing monomers are:

(1) $CH_2=CHSO_3^-Na^+$ sodium vinyl sulfonate
(2) $CH_2=CHCH_2SO_3^-Na^+$ sodium allyl sulfonate
(3)

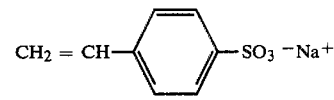

sodium styrene sulfonate

An especially preferred sulfonate containing monomer is metal sulfonate styrene. The molar ratio of sulfonate containing monomer to conjugated diene is about 1/200 to about 1/5, more preferably about 1/150 to about 1/6, and most preferably about 1/100 to about 1/9. Either a water soluble, free radical initiator such as potassium persulfate, ammonium persulfate, water soluble redox couples such as potassium persulfate, sodium metabisulfite or oil soluble, water soluble redox couples such as diisopropyl benzene hydroperoxide, triethylenetetramine are effective in initiating these copolymerizations. The water soluble inorganic systems are preferred because of an apparent reduction of side reactions with the resulting unsaturated polymer.

The surfactants employed for this invention are varied and well known in the art. The typical emulsifiers or surfactants can be employed, however, some are more effective than others in generating latexes of better stability. A preferred emulsifier is sodium lauryl sulfate. This copolymerization can also be conducted without emulsifier because of the surfactancy of the sulfonate monomer.

Buffering agents can be employed in the instant polymerization process and are selected from the group consisting of sodium carbonate, ammonia, sodium acetate, trisodium phosphate etc. When utilized, these buffering agents are employed at a concentration of about 0.1 to about 5 grams/100 grams water employed in the emulsion system.

Chain transfer agents can be readily employed in the instant polymerization process for controlling the molecular weight of the resultant copolymer. The concentration of chain transfer agent is from 0 to about 1.0 grams/100 grams of the combined weight of the sulfonate containing monomer and the conjugated diene.

The free radical emulsion copolymerization of the water soluble sulfonate containing polymer and the conjugated diene yields a stable latex, wherein the resultant water insoluble co or terpolymer is not covalently crosslinked and possesses substantial ionic crosslinking, and has about 0.5 to about 5 weight percent of chemically combined sulfur, more preferably about 0.6 to about 3. To the resultant latex is added the tackifier resin to form the emulsion type adhesive composition.

COMMERCIAL TACKIFIER RESINS

To the emulsion of the metal neutralized sulfonated elastomeric co or terpolymer is added a commercial tackifying resin having a softening point of about 0° C. to about 160° C., more preferably about 50° C. to about 140° C. and most preferably about 70° C. to 120° C. A variety of commercial tackifier resins are available. Some of these resins contain $\alpha$ and/or $\beta$ pinene base and/or pire base polyterpene resins as the main ingredient, while others are derived from the polymerization of petroleum or coal distillates which consist of aliphatic dienes, mono and diolefins and cyclic olefins having about 5 to about 6 carbon atoms. The latter type of tackifiers have primarily piperyline and/or isoprene structure. A general but excellent description of tackifying resins derived from petroleum derivatives can be found in, for example, *Encyclopedia of Polymer Science and Technology*, Vol. 9, pages 853 to 860, chapter by John Findlay, published by John Wiley & Sons, NY (1968).

Typical but non-limiting tradenames of these commercial tackifiers are Wingtack of Goodyear, Escorez of Exxon, Piccolyte of Hercules and Zonarez of Arizona Chemicals. Recently, these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often, their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogenous, the number average molecular weight $\overline{M}n$, as measured by GPC, can be from about 300 to about 5000, and more preferably about 500 to about 2000, and most preferably about 700 to 1600.

As well-known to those familiar with the use of tackifying resins, because of their wide range compatability, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the emulsion type adhesive composition at about 25 to about 700 parts by weight per 100 parts by weight of the metal neutralized sulfonated elastomeric co or terpolymer, more preferably about 50 to about 500, and most preferably about 75 to about 300.

In forming the emulsion type adhesive composition of the metal neutralized sulfonated elastomeric co or terpolymer the tackifier resin is dissolved in a hydrocarbon solvent such as toluene at a concentration level of about 20 to about 70 grams per 100 ml of solvent, for example 50 grams. The solution of tackifier resin is added to the emulsion of the metal neutralized sulfonated elastomeric co or terpolymer and vigorously mixed to form the emulsion type adhesive composition.

METHOD OF APPLICATION

The emulsion of the metal neutralized sulfonated elastomeric co or terpolymer is doctor bladed to the required thickness onto a substrate and the formed adhesive film is dried at room temperature or elevated temperature either under vacuum or at atmospheric pressure for a sufficient period of time in order to remove the water from the adhesive film.

DETAILED DESCRIPTION OF THE PREFERRED EMBODIMENTS

As exemplified in the following illustrative examples a series of emulsion type adhesive composition were prepared.

EXAMPLE 1

EMULSION COPOLYMERIZATION OF ISOPRENE AND SODIUM STYRENE SULFONATE

A 250 ml. glass pressure bottle was charged with 1.6 g sodium lauryl sulfate, 60 ml. distilled and deareated water, 25 g of isoprene, 2.0 g of sodium styrene sulfonate, 0.17 g of dodecyl thiol and 0.1 g of potassium persulfate. The bottle was sealed under nitrogen with a two-hole crown cap containing a rubber septum. The bottle was placed into a safety screen in a thermostated water shaker bath at 50° C. Shaking was immediately commenced. After an 8 hour reaction time, the bottle was removed and 3 ml. of a methanolic "shortstop" solution of 0.024 g hydroquinone and 0.036 g of the oxidation stabilizer 2,6-di-t-butyl-4-methylphenol (DBMP) was added via a syringe. The bottle was again shaken for an additional 10 minutes, cooled, and then opened. This is termed emulsion A. This emulsion was steamed to remove residual isoprene monomer. The copolymer emulsion was next added to a stirred solution of 0.15 g DBMP in 500 ml. of methanol. Approximately 20 g of NaCl was then added to coagulate the emulsion. The resulting white crumb was isolated by using an 80 mesh screen and a dental rubber dam. The copolymer was washed three times with 500 ml. of distilled water and finally rinsed with 200 ml. of methanol. The elastomeric white crumb was placed in a vacuum oven at 40° C. for overnight driving. This process yielded 21.71 g (80.4%) of the polymer containing 0.56 weight percent sulfur which is equivalent to 1.22 mole percent NaSS in the copolymer.

EXAMPLE 2

In the second series of experiments emulsions were prepared in exactly the same fashion as those in Example 1, except the recipe was somewhat different. In the second set the amount of the sodium styrene sulfonate was doubled and hence the final product contained about twice the concentration of metal sulfonate linkages or groups as compared to products of Example 1. The quantities of other ingredients were adjusted accordingly. The emulsions obtained in this series of experiments are identified as emulsion B.

EXAMPLE 3

PREPARATION OF EMULSION OF ISOPRENE/NaSS COPOLYMER AND ESCORE RESIN

Emulsions containing both isoprene/NaSS copolymer and Escorez resin tackifier can be prepared by two methods. These are:

3.1 Escorez resen (50.0 g) was dissolved into 100 ml. of toluene. Seven ml. (ca. 3.5 g polymer) of this solution were added to 10 ml. of copolymer emulsion A or emulsion B (ca. 3.5 g of copolymer) and vigorously mixed on a shaker bath for 20 minutes. A new, "stable" emulsion was evaluated for adhesive application.

3.2 Thirty ml. of an Escorez emulsion were combined with 43 ml. of emulsion A or emulsion B and mixed as in Example 1. The new, "stable" emulsion was evaluated as described.

Either of the above two methods could be employed for the preparation of adhesives and the preference of one over the other is not a critical component of the present inventions.

EXAMPLE 4

Desired quantities of the emulsions prepared from above techniques were placed in flat bottom petrie dishes and the bulk of the solvent (which contained mainly the water and small traces of other organic solvents and monomers, etc.) was flashed off in a hood overnight. The final drying of the polymeric film was done in a vacuum oven. Thin films of about 2 to 10 mils in thickness were thus achieved. This technique of preparing adhesive films was adopted due to the lack of a doctor's knife set up procedure in our laboratory. The latter procedure is typically followed in the adhesive industry to obtain accurate films of desired thicknesses. The dried films were sandwiched in mylar sheets and compressed under mild pressure to obtain adhesive samples having uniform adhesive films. Shims of accurately known dimensions were used during compression. This way not only the thickness of the film could easily be controlled to a satisfactory extent, but the wetting of the mylar sheets was assured as well. Appropriate sized adhesive specimens were cut using a standard die and T-peel test were made on an Instron tensile testing machine. The forces necessary to pull apart the mylar films were recorded on a strip chart recorder. This procedure of measurement is very similar to standard ASTM Test D-249 adhesion tests. Illustrative data are reported in the following table.

In the last column of this table, data for a blend composition similar to one typically used in the adhesive industry are shown for comparative purposes. The aggressiveness of the tack of compositions shown in columns 1 and 2 can be controlled easily by various techniques which are well familiar to those skilled in this art. The important point here to note is that the compositions 1 and 2 in their as-produced state give peel values which easily meet the adhesive industry's requirements.

What is claimed is:

1. An adhesive composition which comprises an emulsion of:

(a) a metal neutralized sulfonated elastomeric co- or terpolymer, said neutralized sulfonated co- or terpolymer having about 5 to about 250 meq. of neutralized sulfonated groups per 100 grams of said metal neutralized sulfonated co- or terpolymer, wherein said metal neutralized sulfonated elastomeric co- or terpolymer comprises at least 80% by weight of at least one conjugated diene having from 4 to 12 carbon atoms or a combination of at least 80% by weight of at least one conjugated diene and styrene, wherein the combination contains less than 50 weight percent styrene of the total 80 weight percent and a minor proportion of a metal or amine neutralized sulfonate monomer characterized by the formula:

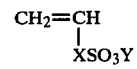

where X is aromatic, and Y is a cation selected from Groups IA, IIA, IB and IIB of the Periodic Table or an amine of the formula:

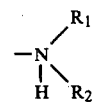

where $R_1$ and $R_2$ can be aliphatic groups of $C_1$ to $C_{12}$ or hydrogen, said co- or terpolymer being water insoluble, substantially gel-free, thermally stable and oxidatively stable having at least 0.5 weight percent chemically combined to less than 5 weight percent chemically combined sulfur, with a reduced viscosity as measured in a solvent at a concentration of 10 gm/liter of greater than 0.2 and less than 5.0; and (b) about 25 to about 700 parts by weight of a hydrocarbon tackifying resin based on a petroleum or coal tar distillate per 100 parts by weight of said metal neutralized sulfonated elastomeric co- or terpolymer.

TABLE 1

PHYSICAL PROPERTIES OF ADHESIVE COMPOSITIONS PREPARED FROM EMULSIONS OF COPOLYMERS OF ISOPRENE-SODIUM STYRENE SULFONATE AND PETROLEUM RESINS

| Blend No.: | 119-1 | 119-2 | 32-1 |
|---|---|---|---|
| Composition: | Isoprene/NaSS(1.22 ml.) + Escorez 1310 (~50/50) | Isoprene/NaSS(1.93 ml.) + Escorez 1310 (~50/50) | Kraton 1107/ Escorez 1310 (50/50) |
| Lb. Force | 5.1 | 4.6 | 11.0 |
| Type of Failure | Cohesive | Cohesive | Partly Cohesive |
| Tackiness | Tacky | Tacky | Tacky |
| Glass Transition Temperature °C. (Rubber Phase) | −34 | −42 | −22 |

2. An adhesive composition according to claim 1, wherein said sulfonate containing monomer is a metal neutralized sulfonated styrene.

3. An adhesive composition according to claims 2 or 1, wherein said conjugated diene is selected from the group consisting of 1,3-butadiene, isoprene and chloroprene and mixtures thereof.

4. An adhesive composition according to claims 2 or 1, wherein said conjugated diene is 1,3-butadiene.

5. An adhesive composition according to claims 2 or 1, wherein said conjugated diene is isoprene.

* * * * *